(12) United States Patent
Scott et al.

(10) Patent No.: US 6,413,017 B2
(45) Date of Patent: Jul. 2, 2002

(54) CONVERSION OF HYDROCARBON-CONTAMINATED PARTICULATE SOIL AND/OR ROCK TO FERTILE SOIL USEFUL IN EROSION CONTROL

(76) Inventors: Jonathan B. Scott; Billy R. Scott, both of P.O. Box 170, Diana, TX (US) 75640; Lloyd E. Deuel, Jr., 8402 Whiterose Ct., College Station, TX (US) 77845

( * ) Notice: Subject to any disclaimer, the term of this patent is extended or adjusted under 35 U.S.C. 154(b) by 0 days.

(21) Appl. No.: 09/792,475

(22) Filed: Feb. 23, 2001

Related U.S. Application Data
(60) Provisional application No. 60/189,124, filed on Mar. 14, 2000.

(51) Int. Cl.$^7$ .................................................. B09C 1/08
(52) U.S. Cl. ...................... 405/128.5; 71/903; 71/901; 405/128.1; 405/128.75; 405/128.7; 405/128.45
(58) Field of Search ........................ 405/128.1, 128.15, 405/128.45, 128.5, 128.7, 128.75; 166/279; 71/901, 903

(56) References Cited

U.S. PATENT DOCUMENTS

| | | | | |
|---|---|---|---|---|
| 3,616,204 A | * | 10/1971 | Linn | |
| 4,410,350 A | * | 10/1983 | Judd | |
| 4,494,975 A | * | 1/1985 | DeBoodt et al. | |
| 5,100,455 A | * | 3/1992 | Pinckard et al. | |
| 5,264,018 A | * | 11/1993 | Koenigsberg et al. | |
| 5,286,140 A | * | 2/1994 | Mather | |
| 5,415,777 A | * | 5/1995 | Krempen et al. | |
| 5,525,139 A | * | 6/1996 | Gill | |
| 5,609,667 A | * | 3/1997 | Dickerson | |
| 6,302,936 B1 | * | 10/2001 | Adam | 47/4 |
| 6,315,494 B1 | * | 11/2001 | Oberle | 405/128.5 |

* cited by examiner

Primary Examiner—H. Shackelford
Assistant Examiner—Katherine Mitchell
(74) Attorney, Agent, or Firm—John G. Fischer

(57) ABSTRACT

A mixture of hydrocarbons with particulate rock and/or soil that is incapable of sustaining growth of erosion retarding plants can be converted to soil that is capable of sustaining such plant growth by blending the mixture with particulate biomass, and/or with particulate carbonates, hydroxides, and/or oxides of calcium and/or magnesium to produce a compostable aggregate and then exposing suitable piles of the compostable aggregate to the natural atmosphere for a sufficient time to cause the conversion of the aggregate to fertile soil.

20 Claims, No Drawings

CONVERSION OF HYDROCARBON-CONTAMINATED PARTICULATE SOIL AND/OR ROCK TO FERTILE SOIL USEFUL IN EROSION CONTROL

CROSS-REFERENCE TO RELATED APPLICATIONS

Priority for this application is claimed under 35 U.S.C. §119(e) from application Ser. No. 60/189,124 filed March 14, 2000.

STATEMENT REGARDING FEDERALLY SPONSORED RESEARCH OR DEVELOPMENT

Not applicable.

BACKGROUND OF THE INVENTION

Practical drilling for oil and/or natural gas in most locations in the world that are now being explored requires use of a viscous liquid lubricant, which is generally called "drilling mud" or simply "mud" by those who use it, and the word "mud" when used below in this specification shall be understood to mean drilling mud unless expressly stated to the contrary or required by the context. Mud normally is pumped continuously into and flows continuously out of a drill hole whenever drilling is underway. The mud flows into and out of the drill hole through separate passageways that insure that mud pumped into the drill hole must reach the near vicinity of the drill bit that is actually cutting a drill hole deeper during drilling before the mud can enter the passageway through which mud flows out of the drill hole during drilling. The mud serves to cool the drill bit and to remove from the drill hole soil and/or rock in the form of particles cut by the drill bit. If the cut rock and/or soil particles were not removed from the drill hole, these particles would eventually clog the drill bit and make continued drilling impossible.

A very large variety of physico-chemical compositions of mud are known in deep drilling (i.e., drilling to a depth greater than a few hundred feet below ground level). This variety is required in order to suit widely varying conditions of drilling. The particular class of mud to which this invention most particularly relates is characterized by containing organic materials, usually primarily petroleum-derived hydrocarbons, that constitute at least 50% of the total mass of the mud. This class of mud will usually be designated below in this specification as "reactive" mud, a term of established use in drilling. Reactive mud usually also contains some water and one or more types of inorganic salts, and if the mud contains inorganic salts, it usually also contains a non-hydrocarbon organic dispersing agent in order to avoid separation of the mud into more than one bulk liquid phase, at least while the mud is being used. (To be a bulk liquid phase as that term is to be understood in this specification, a phase must exist as at least one large enough continuous volume to be visible with the naked eye, and that continuous volume itself must be visually uniform. Therefore, a liquid that is stably dispersed in another liquid can not be a bulk liquid phase except in very unusual instances when the two liquids have almost exactly the same density; otherwise, a volume of liquid large enough to be seen with the naked eye is also large enough to sink or rise through another liquid with which it is mixed.) As a result of these constituents of a reactive mud, the mixture of the reactive mud with soil or rock chips that emerges from the drill hole during drilling with a reactive mud is normally incapable of functioning as soil to sustain any plants as large as grasses and other plants that are effective in stabilizing soils against erosion. Furthermore, this mixture of reactive mud with soil and/or rock chips that emerges from deep drilling with a reactive mud is usually legally regarded as a pollutant that must be disposed of in accordance with regulations under one or more of the U.S. Resource Conservation and Recovery Act, Safe Drinking Water Act, and Clean Water Act. Other jurisdictions, including the individual U.S. states, have additional regulations. The volume of this pollutant is often large, so that legal disposal of it is often costly.

Deep drilling may be performed wherever oil (and/or some other valuable recoverable fluid and/or fluidizable mineral) is believed to underlie the earth's surface, and the surface at many places where drilling is desired is not one on which humans can reasonably be expected to work regularly for as long a time as is required for deep drilling, most often because the surface has too large an angle of slope. It is therefore customary, when deep drilling is to be performed under a naturally sloping surface, to create by means of earth-moving machinery a level area of at least about one acre, this level area being called a "drilling pad", that surrounds the surface end of the intended drill hole and provides accommodation for the workers and machinery needed for practical deep drilling. A drilling pad on a large steeply sloping surface therefore constitutes an unnatural plain that interrupts the natural slope. Such an unnatural plain is subjected to strong erosive action during rain, particularly heavy rain, by water that falls onto the upslope periphery of the plain from the natural surface and falls off the downslope periphery of the plain on to the lower natural surface. In fact, experience in deep drilling has shown that such an unnatural plain, if built as simply as has been described above, does not usually last as long as required for deep drilling in areas susceptible to frequent heavy rains. In such areas, it is therefore usual to surround the drill pad with a buffer zone several tens of feet in width, the buffer zone sloping downward from the drill pad, so that any anticipated volume of run-off water flow will be diverted around the drill pad. This stratagem, of course, simply transfers the erosive force from the drill pad to the buffer zone.

Even at drilling sites that do not have a sharp natural slope, the natural terrain is seldom if ever so nearly level that a drill pad is not built prior to drilling. While drill pads on other sites are not usually subjected to such strongly erosive forces as are drill pads on steeply sloping sites, almost any drill pad, or even any drilling site without a drill pad, is likely to require compliance with legal guidelines to reduce pollution and/or erosion problems that are generated by some part of the total activity required to successfully drill a deep well.

The surface of a drill pad, along with the surface of its buffer zone if it has one, almost inevitably becomes contaminated during deep drilling with hydrocarbons and/or other materials considered undesirable in most parts of the natural environment. Therefore, legal regulations in most places where deep drilling is done require some substantial mitigation of the danger of erosion from the area of a drill pad and its buffer zone if any after the completion of drilling, in order to reduce the danger of hydrocarbons and other pollutants being washed from such former drilling sites onto other land or into bodies of surface water by run-off from the former drilling site after natural rains.

Erosion from terrain of almost any shape, if the terrain has a surface of particulate matter such as soil or gravel, rather than of massive solid rock, can be considerably mitigated if the particulate surface of the terrain is made up of soil that is sufficiently fertile to support the growth of plants that reduce the tendency to erosion, from flows of fluids over the surface of the soil in which they grow, and such plants are growing on the soil. The presence of such plants, while useful on terrain of any shape, is particularly effective in reducing the otherwise high amounts of erosion likely from sharply sloping terrain that has a particulate surface. Essentially every drill pad has a particulate surface, because a drill pad by definition is an artificial construction, and it is much cheaper to move particulate matter than a slab of solid rock large enough to serve as an effective drill pad. Given a sufficient supply of fertile soil, the growth of erosion retarding plants on and around the area of a no longer used drill pad can readily be achieved by means already known in themselves, whether or not the terrain needs to be reconfigured to reduce erosion. Realistically, however, a sufficient supply of fertile soil is rarely ever available naturally in the near vicinity of a no longer used drill pad, particularly when the pad was built on a large sloping surface.

Accordingly, one major objective of this invention is to provide a practical method for reducing erosion from areas of land in which substantial, erosion-promoting alterations of the natural terrain have been made for economic reasons. An alternative objective of the invention is to provide a practical method for remediating mixtures of petroleum hydrocarbons with particulate rock or soil so that substantially the entirety of such mixtures as remediated becomes fertile soil that is capable of supporting the growth of plants that reduce the likelihood of erosion of soil in which the plants grow. Other alternative, concurrent, and/or more detailed objectives will become apparent from the detailed description below.

BRIEF SUMMARY OF THE INVENTION

It has been found that infertile mixtures of petroleum hydrocarbons with particulate rock or soil can be converted to fertile soils by commingling these infertile mixtures with at least one of:

(I) nitrogenous, non-petroleum-derived organic matter and water in controlled proportions; and (II) at least one material selected from the group consisting of the oxides, hydroxides, and carbonates of calcium, and the oxides, hydroxides, and carbonates of magnesium, and mixtures of any two or more thereof; and (III) composting the resultant commingled materials under conditions such that the surfaces of the particles of the particulate rock or soil are accessible to the natural atmosphere.

The fertile soil thus produced, or fertile soil from other sources, can be effectively used to reduce the erosion potential of unnaturally created terrain by placement of the fertile soil in suitable areas and causing erosion-retarding plants to grow on the outer surface of the placement areas.

DETAILED DESCRIPTION OF THE INVENTION

A remediation embodiment of the invention that includes additional of nitrogeneous, non-petroleum-derived organic matter is most effectively and therefore preferably applied to mixtures of petroleum-derived organic substances with particulate rock or soil that have the following characteristics, the preference being independent for each characteristic, combinations of two or more of these preferences being more preferred than the same degree of preference of only one of the combined individual preferences alone, the preference of such combinations increasing with the number of individual preferences combined:

the fraction by weight of the total mixture that is petroleum-derived organic substances constituted of molecules that have from 6 to 10 carbon atoms each (this group of petroleum-derived organic substances constituted of molecules that have from 6 to 10 carbon atoms each being commonly designated in the petroleum industry, and optionally designated below in this specification, as "GRO" or "gasoline range organics") preferably is at least, with increasing preference in the order given, 0.001, 0.010, 0.020, 0.030, 0.040, 0.050, 0.060, 0.070, 0.080, 0.090, or 0.100 percent ("percent" being usually abbreviated below in this specification as "%") and independently preferably is not more than, with increasing preference in the order given, 10,7,4, 2.0, 1.0,0.8,0.6,0.4,0.2, or 0.12%;

the fraction by weight of the total mixture that is petroleum-derived organic substances constituted of molecules that have from 10 to 28 carbon atoms each (this group of petroleum-derived organic substances constituted of molecules that have from 10 to 28 carbon atoms each being commonly designated in the oil industry, and optionally designated below in this specification, as "DRO" or "diesel range organics") preferably is at least, with increasing preference in the order given, 0.5, 1.0, 2, 4, 6, 8, 10, 12, or 14% and independently preferably is not more than, with increasing preference in the order given, 40, 30, 27, 25, 23, 21, 19, 17, or 15%;

the fraction by weight of the total mixture that is petroleum-derived organic substances constituted of molecules that have at least 20 carbon atoms each (this group of petroleum-derived organic substances constituted of molecules that have at least 20 carbon atoms each being commonly designated in the oil industry, and optionally designated below in this specification, as "O&G" or "oil and grease") preferably is at least, with increasing preference in the order given, 1.0, 2, 4, 6, 8, 10, 12, 14, 16, or 18% and independently preferably is not more than, with increasing preference in the order given, 40, 30, 27, 25, 23, 21, or 19%;

the fraction by weight of the total mixture that is petroleum-derived organic substances constituted of molecules that have from 8 to 40 carbon atoms each (this group of petroleum-derived organic substances constituted of molecules that have from 8 to 40 carbon atoms each being optionally designated below in this specification as "MRO" or "major range organics") preferably is at least, with increasing preference in the order given, 0.5, 1.0, 2, 4, 6, 8, 10, 12, or 14% and independently preferably is not more than, with increasing preference in the order given, 40, 30, 27, 25, 23, 21,19,17, or 15%;

the fraction by weight of the total mixture that is volatilized upon being heated from ambient temperature to 100 C is not more than, with increasing preference in the order given, 5, 3.0, 2.0, 1.7, 1.4, 1.1, 0.9, 0.7, 0.5, or 0.3%;

the fraction by weight of the total mixture that is volatilized upon being heated from 100 C. to 150 C. is not more than, with increasing preference in the order given, 10, 7, 5.0, 4.2, 3.8, 3.5, 3.3, 3.1, 2.9, or 2.7% and independently preferably is at least, with increasing preference in the order given, 0.5, 1.0, 1.4, 1.7, 2.0, 2.2, 2.4, 2.6, or 2.8%;

the fraction by weight of the total mixture that is volatilized upon being heated from 150 C. to 200 C. is not more than, with increasing preference in the order given, 30, 20, 10, 8.0, 7.0, 6.5, 6.0, 5.6, 5.3, or 5.0% and independently preferably is at least, with increasing preference in the order given, 1.0, 2.0, 2.5, 3.0, 3.5, 4.0, 4.3, or 4.6%;

the fraction by weight of the total mixture that is volatilized upon being heated from 200 C. to 250 C. is not more than, with increasing preference in the order given, 20, 15, 10, 8, 7.0, 6.5, 6.0, 5.5, 5.0, 4.6, 4.3, 4.0, 3.8, or 3.6% and independently preferably is at least, with increasing preference in the order given, 0.5, 1.0, 1.4, 1.7, 2.0, 2.5, 2.7, 2.9, 3.1, or 3.3%;

the fraction by weight of the total mixture that is volatilized upon being heated from 250 C. to 300 C. is not more than, with increasing preference in the order given, 9.5, 8.5, 7.5, 6.5, 4.5, 3.5, 2.9, 2.7, 2.5, 2.3, or 2.1% and independently preferably is at least, with increasing preference in the order given, 0.10, 0.3, 0.5, 0.7, 0.9, 1.1, 1.3, 1.5, 1.7, or 1.9%;

the fraction by weight of the total mixture that is volatilized upon being heated from 300 C. to 350 C. is not more than, with increasing preference in the order given, 9.5, 8.5, 7.5, 6.5, 4.5, 3.5, 2.9, 2.7, 2.5, 2.3, or 2.1% and independently preferably is at least, with increasing preference in the order given, 0.10, 0.3, 0.5, 0.7, 0.9, 1.1, 1.3, 1.5, 1.7, or 1.9%; and at least, with increasing preference in the order given, 20, 30, 40, 50, 60, 70, or 80% by weight of the total mixture is particulate shale.

A mixture of petroleum-derived organic substances with particulate rock and/or soil to be treated according to this invention often contains a sufficient content of inorganic salts to limit its suitability as fertile soil. Before other parts of a treatment according to this invention, such inorganic salts should be removed by washing the mixture with a suitable liquid, for example water, to extract from the mixture a sufficient amount of the inorganic salt so that the remainder will not be precluded from fertility by its salts content. If the original mixture being treated contains substantial amounts of sodium, which is the most agriculturally undesirable of all of the common cations in salts likely to occur in practical mixtures being treated according to this invention, it is preferable to use water containing calcium cations in at least the initial stages of rinsing to remove the sodium cations from the mixture of petroleum-derived organic substances and particulate rock and/or soil, because a substantial fraction of the sodium is likely to be bound into the rock and/or soil by physico-chemical bonds that are similar to those found in cation-exchange resins that are in a sodium-rich form—many of the minerals in rocks are aluminum silicates that are cation-deficient in the part of their structure that is strongly chemically bonded and therefore require transient cations for charge balance. Sodium cations bonded in this manner can not be removed by rinsing with water alone, because some alternative cation type must be provided to replace the sodium. In principle, any other cations that do not themselves damage soil for agricultural use can be used, but calcium is preferred because relatively inexpensive sources of it are available from naturally occurring limestone and various dolomitic minerals.

Once a mixture of petroleum-derived organic substances with particulate rock and/or soil has been sufficiently freed of inorganic salts, the primary part of a treatment according to this invention is begun. In order to begin this part of the treatment, the mixture of petroleum-derived organic substances with particulate rock and/or soil is, in one major embodiment, blended with organically-bonded-nitrogen-containing biomass, and, optionally, also with water, to generate a compostable aggregate. An aggregate that meets the following two criteria qualifies as compostable within the meaning of this specification:

the ratio by mass of organically bonded carbon to organically bonded nitrogen in the compostable mixture is not more than, with increasing preference in the order given, 500:1.00, 400:1.00, 300:1.00, 200:1.00, 150:1.00, 125:1.00, 100:1.00, 75:1.00, 65:1.00, 60:1.00, 55:1.00, 50:1.00, 45:1.00, 40:1.00, 35:1.00, 30:1.00, 25:1.00, 20:1.00, or 15:1.0; and the ratio by mass of total organic chemical substances to total inorganic chemical substances exclusive of water in the compostable mixture is at least, with increasing preference in the order given, 0.10:1.00, 0.20:1.00, 0.25:1.00, 0.30:1.00, 0.35:1.00, 0.40:1.00, 0.45:1.00, or 0.50:1.00.

Preferably at least, with increasing preference in the order given, 50, 60, 70, 80, or 90% by weight of the biomass mixed to form a compostable mixture is solid rather than fluid. Independently, at least, with increasing preference in the order given, 50, 65, 80, 90, or 95% by weight of the solid part of the biomass when blended with a mixture of petroleum-derived organic substances with particulate rock and/or soil to form a compostable aggregate is in the form of discrete particles, the largest dimension of which is not more than, with increasing preference in the order given, 50, 40, 30, 25, 20, 18, 16, 14, 12, 10, or 8 centimeters and independently preferably is not more than, with increasing preference in the order given, 0.2, 0.4, 0.6, 0.8, 1.0, 1.2, or 1.4 centimeters. At least one reason for these size preferences is to provide a surface to volume ratio for the solid particles in a compostable aggregate and an access of the natural atmosphere to the surfaces of the solid particles in the compostable aggregate, both of the surface to volume ratio and the atmospheric access being required for efficient biological activity in composting. These particle size preferences apply to any separate types or categories of biomass defined below, in addition to applying to the biomass as a whole.

Any biomass with a sufficient organically-bonded-nitrogen content to enable its aggregates with a mixture of petroleum-derived organic substances with particulate rock and/or soil to form a compostable mixture as described above can be used in a treatment process according to this invention. However, it has been found advantageous and is therefore preferred to use biomass that includes at least two distinct types: animal manure and plant-derived biomass. Still more preferably, it has been found advantageous to use at least two distinct particle shapes for the plant biomass: "Thick" plant biomass, when in the form of particles within a preferred size range, is constituted of particles that, no matter how they are oriented in space, can not (without breakage or mechanical deformation) pass through a rectangular slot that is 100 centimeters in length and has a width that is not more than, with increasing preference in the order given, 10, 8, 6, 4, or 2 millimeters, while "thin" plant biomass, when in the form of particles within a preferred size range, is constituted of particles that, in some orientation in space, can pass through such a slot through which the thick biomass can not pass. Wood chips are a common example of thick biomass, while chopped hay and rice hulls are common examples of thin biomass.

When animal manure is used as part of the biomass, the ratio by weight of the animal manure to other biomass preferably is at least, with increasing preference in the order given, 1.00:40, 1.00:30, 1.00:20, 1.00:15, 1.00:10, 1.00:8, or 1.00:6 and independently preferably is not more than, with increasing preference in the order given, 1.00:1.00, 1.00:1.5, 1.00:2.0, 1.00:2.2, 1.00:2.4, 1.00:2.6, 1.00:2.8, or 1.00:3.00. Independently, when both thick and thin plant biomass are part of the biomass, the ratio by weight of thin plant biomass to thick plant biomass preferably is at least, with increasing preference in the order given, 1.00:50, 1.00:40, 1.00:30, 1.00:20, 1.00:18, 1.00:16, 1.00:14, 1.00:12, 1.00:10, 1.00:8, 1.00:7.0, 1.00:6.5, 1.00:6.0, 1.00:5.5, or 1.00:5.0 and independently preferably is not more than, with increasing preference in the order given, 1.00:0.10, 1.00:0.30, 1.00:0.50, 1.00:0.70, 1.00:0.90, 1.00:1.1, 1.00:1.3, 1.00:1.5, 1.00:1.7, or 1.00:1.9.

In addition to all of its other constituents as specified above, a compostable aggregate preferably contains water in an amount that constitutes at least, with increasing preference in the order given, 2, 5, 7, 9, 11, 13, 15, 17, 19, 21, or 23% of the total mass of the compostable aggregate and independently preferably constitutes not more than, with increasing preference in the order given, 90, 85, 80, 75, 70, 65, or 60% of the total mass of the compostable aggregate.

When a compostable aggregate has been formed as described above, the total volume of aggregate should be arranged into one or more piles of a shape and size suitable for aging. Two distinct types of aging can be used. In aging with static piling, no continuous mechanical or hydraulic means are used to promote aeration of the pile. Instead, the pile is left undisturbed for a time that usually is at least one day and often is several days, and the access of air to the interior of the pile depends only on the void fraction and distribution within the pile and any net flow of air into or out of the pile that occurs because of natural temperature changes in the air surrounding the pile. After such an interval of sitting undisturbed, the pile is stirred and reshaped so that most of the volume of the pile that was near the surface during the interval of sitting undisturbed is moved into the interior of the pile and replaced by other material that was in the interior of the pile during the preceding interval of sitting undisturbed. The principal advantage of static piling is that no operating expense whatever is incurred during the periods of sitting undisturbed, and there is no significant capital expense. On the other hand, for a large pile, the cost of earth moving machinery and its operators makes the cost of the stirring and reshaping between intervals of sifting undisturbed relatively large as long as these stirring and reshaping operations last.

The alternative type of aging utilizes forced aeration. In this type of aging, some mechanical or hydraulic force is used more or less continuously to increase the flow of air around and/or through the pile. The most preferred method of this type of aging uses perforated pipes or some similar source of many separate gas flows within the pile, these sources of gas flow being connected to a source of either compression or suction outside the pile. Alternatively, large fans or blowers directed at the exterior surface of the pile can be used, and in particularly favorable locations, naturally prevailing winds are sufficient to provide forced aeration. Forced aeration is believed to increase the rate of replenishment of air inside the pile with fresh air, compared to the rate with static aging, and in piles with forced aeration no intermittent stirring and reshaping is needed. There is, however, except where more or less continuous natural winds are available, a capital cost for the means of achieving forced aeration and a continuing operating cost for keeping these means operating during the entire period of aging.

Both types of aeration are fully capable of giving satisfactory results, so that the choice between them can reasonably be made on a basis of cost. Which type of aeration is less costly overall will depend on the relative costs of capital, labor, and energy for operating forced aeration means, and these will vary substantially depending on local conditions at the place where treatment according to the invention is carried out.

The choice between static and forced aeration aging preferably should be made before preparation of the compostable aggregate, because the most preferred sizes for the biomass mixed to make the compostable aggregate vary with the aging method to be employed. If forced aeration is to be used, in addition to the preferences given above, the particles of biomass blended to make the compostable aggregate preferably have a maximum dimension that is not more than, with increasing preference in the order given, 5.0, 4.0, 3.0, 2.5, or 2.0 centimeters. If forced aeration is not to be used during aging, the particles of biomass blended to make the compostable aggregate preferably have a maximum dimension that is at least, with increasing preference in the order given, 4.0, 4.5, 5.0, 5.5, 6.0, 6.5, or 7.0 centimeters.

Forced and passive aeration can be practiced alternatively with the same pile, although this is not usually preferred unless natural wind energy is available for frequent forced aeration. In such an instance, intermediate particle sizes of the biomass, e.g., between 3 and 6 centimeters, are preferred.

When static aging is to be used, each pile prepared for aging preferably is not surrounded by any air-impermeable wall or located near any structure that will impair free flow of air around it. Independently, each pile prepared for static aging preferably has a ratio of outer surface in square feet to volume in cubic feet that is not more than, with increasing preference in the order given, 2.0:1.00, 1.0:1.00, 0.75:1.00, 0.50:1.00, 0.45:1.00, 0.40:1.00, 0.36:1.00, 0.33:1.00, 0.30:1.00, 0.28:1.00, 0.26:1.00, 0.24:1.00, or 0.22:1.00 and independently preferably is not less than, with increasing preference in the order given, 0.02:1.00, 0.04:1.00, 0.07:1.00, 0.10:1.00, 0.13:1.00, 0.16:1.00, or 0.18:1.00. In calculating these surface to volume ratios, a pile's base, on which it rests on the ground or some similar solid supporting surface, is not included in the surface area, because the latter is to be understood as including only surface in contact with air. Also, the volume and surface area of each pile are to be determined without taking into account the particulate nature of the compostable aggregate of which the pile consists and the resulting existence of internal surface and void volume; instead the surface area and volume are to be determined as if the outer surface of the pile were covered by a thin, conformable elastic membrane, the area of this hypothetical membrane being considered the surface area of the pile and the volume of space enclosed by this hypothetical membrane and the base of the pile being considered the volume of the pile.

The surface to volume ratio has an effect on the composting process because the chemical reactions that are desired to occur during composting release heat of reaction and the desired reactions are believed to proceed at their maximum speed at some temperature that is greater than the outdoor ambient temperature in most parts of the United States during at least some part of any year. Removal of heat from a composting volume is believed to occur primarily by conductance of heat away from the outer surface by the ambient air. If the surface to volume ratio is larger than optimum, the interior of the composting volume will not reach the temperature of maximum speed for the desired composting reactions, but if the surface to volume ratio of the composting volume is smaller than optimum, the interior of the composting volume will be more likely to reach a temperature that is higher than the temperature of maximum speed of the desired composting reactions. If the surface to volume ratio is extremely low, the interior temperature of a pile may become large enough to volatilize some unreacted hydrocarbons and thereby cause unwanted air pollution.

Aside from its effect on the surface to volume ratio, the shape of a volume of compostable aggregate established for static aging is not believed to have any particular effect on a treatment according to the invention. At least two shapes have been found satisfactory: cones and similar shapes that result from dropping successive incremental volumes of the compostable aggregate that are small relative to the intended final volume of the pile established for aging over a single point on the lower supporting surface for the intended final pile; and rows in the general shape of triangular prisms that can be formed by dropping successive incremental volumes of the compostable aggregate that are small relative to the intended final volume established for aging over successive points at regular intervals along a line, which may be straight or curved, on the lower supporting surface for the intended pile. When rows of this type are used, the ratio between the base width of the row and its height usually is about 2:1, and dimensions from 14 to 30 feet in width are suitable. Wherever suitable terrain is available for establishing rows of this type, they are generally preferred, because the intermittent mixing andreshaping needed for such rows during the aging process can be provided less expensively than for cone shaped piles, by making use of machinery adapted to travel along the length of a row and mix it by means of rotating flails.

If controllable forced aeration is to be used rather than predominantly static aeration, the size and shape of the pile have less effect on the results than with static aeration, because the flow of forced air can be controlled externally to assist in maintaining a stable and favored temperature within the pile and to assure adequate access of air to the interior of the pile. Piles with forced aeration can have supporting walls and therefore a more compact shape for a given volume. However, at least for economy, piles like those preferred for static aeration are generally preferred even for forced aeration, because this type of pile, with only a natural base and no other supporting structure required, is less expensive to construct.

A highly preferred characteristic of a compositing volume, particularly one for which predominantly static aeration is practiced, is self-stabilization of internal temperature even when external temperatures vary widely. The interior temperature of a compositing volume during a process according to this invention preferably maintains itself within a range that is not greater than, with increasing preference in the order given, 30, 25, 20, 15, or 10° F., even when external ambient air temperatures vary over a range of 40° F. or more.

The progress of the desired chemical reactions during composting can be monitored by occasional sampling and determination of the carbon to nitrogen ratio in the sample. During successful composting according to this invention, this ratio decreases more or less continuously as the composting proceeds. When the carbon to nitrogen ratio has reached a value that is not more than, with increasing preference in the order given, 20:1.00, 18:1.00, 16:1.00, 14:1.00, 12:1.00, or 10:1.0, the entire mixture is ready for use as fertile soil to support plant growth. Usually this conversion is achieved within a time of from three to twelve months.

A process according to the invention can of course be used on any mixture of petroleum-derived organic substances and particulate soil or rock. However, the most common source of such a mixture is the cuttings from deep drilling with a predominantly hydrocarbon based drilling mud, so that the process is particularly preferably applied to such cuttings. Ordinarily, all parts of the process can be carried out at a deep drilling site, thereby converting what would otherwise be a pollutant requiring expensive disposal into fertile soil of the type that will be needed later in restoring the drill site to protect it against erosion.

In an alternative embodiment of the invention, at least one material selected from the group consisting of the oxides, hydroxides, and carbonates of calcium, and the oxides, hydroxides, and carbonates of magnesium, and mixtures of any two or more thereof is added to an infertile mixture of hydrocarbons with particulate soil, rock, or both rock and soil. Among these materials, carbonates are least preferred and hydroxides most preferred. Independently, calcium salts are preferred over magnesium salts, and if mixtures of calcium and magnesium salts are utilized, mixtures containing the largest fraction of calcium salts are more preferred. These alkaline earth derived materials may be used instead of nitrogenous matter, or more preferably, both types of these materials may be used together.

When calcium hydroxide, the most preferred among all of the alkaline earth derived materials, is used as the only one of the alkaline earth derived materials in a process according to the invention, all of the following preferences apply to a mixture to be remediated by this embodiment of the invention, each being preferred individually and combinations of the preferences being preferred with greater total preference the greater the number of individual preferences combined:

(IV) the ratio by mass of calcium hydroxide to hydrocarbon preferably is at least, with increasing preference in the order given, 0.2:1.00, 0.4:1.00, 0.6:1.00, 0.8:1.00, 1.0:1.00, 1.2:1.00, 1.4:1.00, 1.6:1.00, 1.80:1.00, 1.85:1.00, 1.90:1.00, 1.95:1.00, or 2.00:1.00 and independently preferably is not more than, with increasing preference in the order given, 5.0:1.00, 4.0:1.00, 3.0:1.00, 2.8:1.00, 2.6:1.00, 2.4:1.00, 2.30:1.00, 2.25:1.00, 2.20:1.00, 2.15:1.00, 2.10:1.00, or 2.05:1.00;

(V) the ratio by mass of calcium hydroxide to water preferably is at least, with increasing preference in the order given, 0.2:1.00, 0.5:1.00, 0.7:1.00, 0.80:1.00, 0.85:1.00, 0.90:1.00, 0.95:1.00, 1.00:1.00, 1.05:1.00, or 1.10:1.00 and independently preferably is not more than, with increasing preference in the order given, 10:1.00, 7:1.00, 5:1.00, 3:1.00, 2.0:1.00, 1.8:1.00, 1.6:1.00, 1.4:1.00, or 1.2:1.00;

(VI) the ratio by mass of calcium hydroxide to artificially generated rock fragments such as drill cuttings preferably is at least, with increasing preference in the order given, 0.03:1.00, 0.05:1.00, 0.07:1.00, 0.09:1.00, 0.11:1.00, 0.13:1.00, or 0.15:1.00 and independently preferably is not more than, with increasing preference in the order given, 1.0:1.00, 0.8:1.00, 0.6:1.00, 0.4:1.00, 0.30:1.00, 0.25:1.00, or 0.20:1.00; and (VII) the ratio of artificially generated rock fragments to naturally weathered soil preferably is at least, with increasing preference in the order given, 0.030:1.00, 0.050:1.00, 0.070:1.00, 0.090:1.00, 0.11:1.00, 0.13:1.00, 0.15:1.00, 0.17:1.00, or 0.19:1.00 and independently preferably is not more than, with increasing preference in the order given, 3.0:1.00, 2.0:1.00, 1.0:1.00, 0.8:1.00, 0.6:1.00, 0.40:1.00, 0.30:1.00, 0.25:1.00, or 0.20:1.00.

If another alkaline earth material is used in addition to or instead of calcium hydroxide, the ratios given above should be adjusted so as to provide the same number of equivalents of alkalinity to the mixture as do the above-specified ratios of calcium hydroxide.

Inasmuch as the group of suitable alkaline-earth derived materials are all alkalinizing, these materials are preferably used in mixtures with soils having a more acidic pH value than is optimum for agricultural use. The ultimate pH value of the remediated soil preferably is at least, with increasing preference in the order given, 5.5, 5.7, 5.9, 6.1, 6.3, or 6.5 and independently preferably is not more than, with increasing preference in the order given, 7.5, 7.3, 7.1, or 6.9. Often, the above-specified preferred ratios of calcium to hydrocarbon content in an initial mixture to be remediated in a process according to the invention cause the pH of the remediated mixture to exceed the preferred ultimate pH values for the remediated soil immediately after the hydrocarbon reduction part of the remediation is completed. This condition, however, does not prevent achieving an ultimate pH within the preferred range, because sufficient exposure to the ambient atmosphere will bring the partially remediated soil within a preferred pH range as a result of gradual conversion of the more strongly alkaline among the suitable alkaline earth derived materials that are preferred for remediation to the less alkaline carbonates by reaction with carbon dioxide from the atmosphere.

The action of the unspecified microorganisms in soil that lead to bioremediation by reduction of hydrocarbon content is increased by the use of at least one of the above specified alkaline earth derived materials. Therefore, it is particularly advantageous to utilize both an alkaline earth derived material in addition to nitrogenous material, which usually also contains microorganisms effective in reduction of hydrocarbon content. When both alkaline earth derived materials and nitrogenous materials are used, all of the preferences stated above for use of either material apply to the use of both of these remediation adjuvants.

This invention may be further appreciated by consideration of the following examples, which are not to be construed as limiting the invention in any way except to whatever extent the data given in the examples may be incorporated into one of the pending claims.

A mixture of drilling cuttings and mud was utilized for the examples and was shown by analysis to contain 12.6% of Total Petroleum Hydrocarbons as measured by infrared spectroscopy according to U.S. Environmental Protection Agency Method 418.1. This mixture also contained 11.2% of water and 76.2% of solids, presumably primarily inorganic rock fragments.

A Lufkin fine sandy loam (Vertic Albiqualfs) was also used. Selected characteristics of this soil are shown in Table 1 below.

TABLE 1

| Constituent | Sand | Silt | Clay | Total Carbon |
|---|---|---|---|---|
| Percent of Constituent in Soil Used | 51 | 42 | 7 | 2.2 |

The biological activity of some of the soil used was reduced, without changing its total organic content substantially, by heating the soil for 48 hours in an oven maintained at 105° C. Thus treated soil is denoted hereinafter as "sterilized" even though it is realized that full sterilization was not likely achieved.

The mixture of drilling cuttings and mud was mixed with solid pulverized calcium hydroxide to produce intermediate mixtures containing 10%, 20% or 50% of calcium hydroxide. Each of these intermediate mixtures and the mixture of drilling cuttings and mud itself were individually mixed with the sterilized and unsterilized Lufkin fine sandy loam as described above to form mixtures containing 50%, 67%, or 80% of the dried soil. (When using unsterilized soil, its 22.7% moisture content was not counted as part of the dry mass, while the sterilized soil was considered to be 100% dry solids. Each type of soil mixture was placed in a separate shallow dish microcosm to which sufficient water was added to bring the total water content of the mixture to 35%. These mixtures were maintained at normal ambient human comfort temperature in a laboratory for 120 days each and then examined for Total Petroleum Hydrocarbons content. Results are shown in Table 2 below.

TABLE 2

| % $Ca(OH)_2$ in Mixture with Drilling Cuttings | % of Mixture from Column at Left Mixed with Soil | Soil Sterilized? | % Total Petroleum Hydrocarbons in "Remediated" Mixture after 120 Days |
|---|---|---|---|
| 0 | 50 | Yes | 4.5 |
| 10 | 50 | Yes | 3.6 |
| 20 | 50 | Yes | 3.0 |
| 50 | 50 | Yes | 1.5 |
| 0 | 50 | No | 2.7 |
| 10 | 50 | No | 2.2 |
| 20 | 50 | No | 1.8 |
| 50 | 50 | No | 1.5 |
| 0 | 33 | Yes | 3.0 |
| 10 | 33 | Yes | 1.8 |
| 20 | 33 | Yes | 1.4 |
| 50 | 33 | Yes | 0.8 |
| 0 | 33 | No | 1.5 |
| 10 | 33 | No | 1.3 |
| 20 | 33 | No | 1.1 |
| 50 | 33 | No | 0.8 |
| 0 | 20 | Yes | 1.9 |
| 10 | 20 | Yes | 0.6 |
| 20 | 20 | Yes | 0.5 |
| 50 | 20 | Yes | 0.4 |
| 0 | 20 | No | 0.9 |
| 10 | 20 | No | 0.6 |
| 20 | 20 | No | 0.5 |
| 50 | 20 | No | 0.4 |

In all instances in Table 2, the amount of Total Petroleum Hydrocarbons measured after 120 days is less than would be expected from dilution alone, so that the calcium hydroxide addition has a benefit for even sterilized soil. However, at least with the lower advantages of calcium hydroxide, there is a still greater reduction in Total Petroleum Hydrocarbons content if the soil is unsterilized.

The invention claimed is:

1. A process for converting an infertile mixture of hydrocarbons with particulate soil, rock, or both rock and soil, said infertile mixture being free of plant growth-inhibiting concentrations of water soluble salts, to soil capable of sustaining growth of plant species that reduce the tendency of soil in which they grow to undergo erosion by movement of a fluid over the surface of the soil, said process comprising operations of:

(I) blending said infertile mixture with at least one of:
particulate biomass and
particulate material selected from the group consisting of the oxides, hydroxides, and carbonates of calcium, and the oxides, hydroxides, and carbonates of magnesium, and mixtures of any two or more thereof to generate a compostable aggregate in which the ratio by mass of organically bonded carbon to organically bonded nitrogen is not more than 500:1.00 and the ratio by mass of total organic chemical substances to total inorganic chemical substances exclusive of water in the compostable aggregate is at least 0.10:1.00;

(II) forming from said compostable aggregate and, optionally, additional water, at least one pile of the compostable aggregate that is supported by a base and has an exterior surface in contact with the natural atmosphere; and (III) aging the pile or piles forming in operation (II) as recited above in contact with the natural atmosphere until the ratio by weight of organically bonded carbon to organically bonded nitrogen within the pile is not greater than 20:1.0, whereby the aged pile or piles become said soil capable of sustaining growth of plant species that reduce the tendency of soil in which they grow to undergo erosion by movement of a fluid over the surface of the soil.

2. A process according to claim 1, wherein particulate biomass is used in operation (I) as described above, no unnatural external source of mechanical or hydraulic energy is used during aging operation (III) to increase the flow of air into the interior of said pile or piles, and each said pile has a shape and size such that the area in square feet of the pile's surface in contact with the natural atmosphere has a ratio to the pile's volume in cubic feet that is from 0.10:1.00 to 0.75:1.00.

3. A process according to claim 2, wherein the biomass blended in operation (I) consists of particles with an average largest particle linear dimension that is from 3.0 to 8.0 centimeters.

4. A process according to claim 1 wherein particulate biomass is used in operation (I), an unnatural external source of mechanical or hydraulic energy is used during aging operation (III) to increase the flow of air into the interior of said pile or piles, and the biomass blended in operation (I) consists of particles with an average largest particle linear dimension that is from 1.5 to 4.0 centimeters.

5. A process according to claim 4, wherein the biomass blended in operation (I) comprises both animal manure and plant-derived biomass in amounts such that the mass of animal manure has a ratio to the mass of plant biomass that is from 1.0:40 to 1.0:1.0.

6. A process according to claim 5, wherein the biomass blended in operation (I) comprises both thick and thin plant biomass in amounts such that the mass of the thick plant biomass has a ratio to the mass of the thin plant biomass that is from 1.00:14 to 1.0:1.1.

7. A process according to claim 1, wherein said infertile mixture of hydrocarbons with particulate soil, rock, or both rock and soil has been produced by collecting the cuttings that emerge from deep drilling into rock, soil, or both rock and soil, the drilling using a drilling mud that contains petroleum based hydrocarbons in a greater mass than water, and then washing the collected cuttings with sufficient water to make the washed collected cuttings free of plant growth-inhibiting concentrations of water soluble salts.

8. A process according to claim 7, wherein particulate biomass is used in operation (I) as described above, no unnatural external source of mechanical or hydraulic energy is used during aging operation (III) to increase the flow of air into the interior of said pile or piles, and each said pile has a shape and size such that the area in square feet of the pile's surface in contact with the natural atmosphere has a ration to the pile's volume in cubic feet that is from 0.10:1.00 to 0.75:1.00.

9. A process according to claim 8, wherein both particulate biomass and particulate material selected from the group consisting of the oxides, hydroxides, and carbonates of calcium, and the oxides, hydroxides, and carbonates of magnesium , and mixtures of any two more thereof are mixed in operation (I).

10. A process according to claim 8, wherein the biomass blended in operation (I) consists of particles with an average largest particle linear dimension that is from 3.0 to 8.0 centimeters.

11. A process according to claim 7, wherein both particulate biomass and particulate material selected from the group consisting of the oxides, hydroxides, and carbonates of calcium, and and the oxides, hydroxides, and carbonates of magnesium, and mixtures of any two more thereof are mixed in operation (I).

12. A process according to claim 7, wherein particulate biomass is used in operation (I) an unnatural external source of mechanical or hydraulic energy is used during aging operation (III) to increase the flow of air into the interior of said pile or piles, and the biomass blended in operation (I) consists of particles with an average largest particle linear dimension that is from 1.5 to 4.0 centimeters.

13. A process according to claim 12, wherein both particulate biomass and particulate material selected from the group consisting of the oxides, hydroxides, and carbonates of calcium, and the oxides, hydroxides, and carbonates of magnesium, and mixtures of any two more thereof are mixed in operation (I).

14. A process according to claim 12, wherein the biomass blended in operation (I) comprises both animak manure and plant-derived biomass in amounts such that the mass of animal manure has a ratio to the mass of plant biomass that is from 1.0:40 to 1.0:1.0.

15. A process according to claim 14, wherein the biomass blended in operation (I) comprises both thick and thin plant biomass in amounts such that the mass of the thick plant biomass has a ratio to the mass of the thin plant biomass that is from 1.00:14 to 1.0:1.1.

16. A process according to claim 15, wherein both particulate biomass and particulate material selected from the group consisting of the oxides, hydroxides, and carbonates of calcium, and the oxides, hydroxides, and carbonates of magnesium, and mixtures of any two more thereof are mixed in operation (I).

17. A process according to claim 7, wherein both particulate biomass and particulate material selected from the group consisting of the oxides, hydroxides, and carbonates of calcium, and the oxides, hydroxides, and carbonates of magnesium, and mixtures of any two more thereof are mixed in operation (I).

18. A process according to claim 1, comprising an additional operation of placing the fertile soil produced in the process according to claim 7 in suitable areas on, around, or both on and around, an abandoned drill pad and causing erosion-retarding plants to grow on the outer surface of the areas on which the fertile soil is placed.

19. A process according to claim 1, wherein both particulate biomass and particulate material selected from the group consisting of the oxides, hydroxides, and carbonates of calcium and magnesium and mixtures of any two or more thereof are mixed in operation (I).

20. A process according to claim 1, wherein particulate material selected from the group consisting of the oxides, hydroxides, and carbonates of calcium, and carbonates of magnesium, and mixtures of any two or more thereof are mixed in operation (I).

* * * * *